Figure 1:
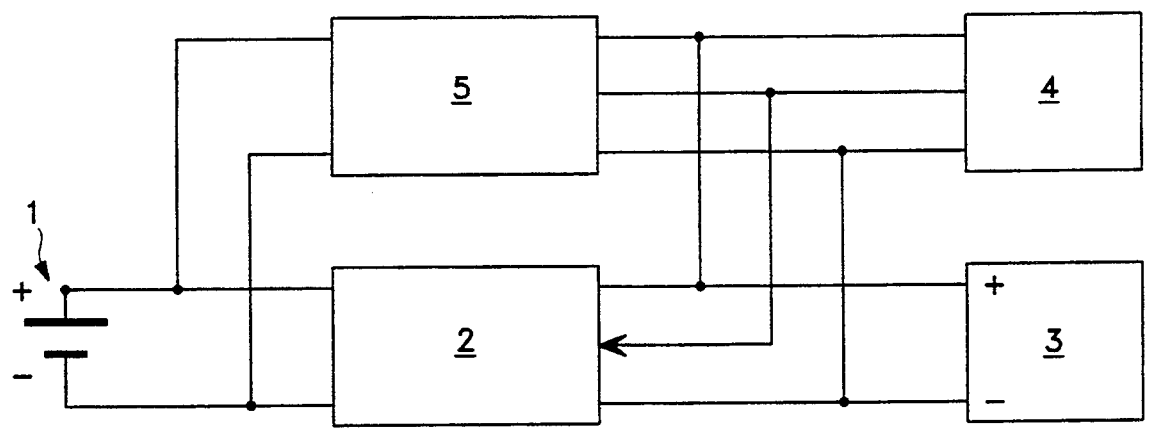

United States Patent [19]
Hasvold

[11] Patent Number: 5,395,491
[45] Date of Patent: Mar. 7, 1995

[54] METHOD FOR PREVENTING SEA WATER CELLS FROM BEING DESTROYED BY BIOFOULING

[75] Inventor: Oistein Hasvold, Oslo, Norway

[73] Assignee: Den norske stats oljeselskap a.s., Stavanger, Norway

[21] Appl. No.: 30,364

[22] PCT Filed: Sep. 16, 1991

[86] PCT No.: PCT/NO91/00118

§ 371 Date: Mar. 19, 1993

§ 102(e) Date: Mar. 19, 1993

[87] PCT Pub. No.: WO92/05597

PCT Pub. Date: Apr. 2, 1992

[30] Foreign Application Priority Data

Sep. 21, 1990 [NO] Norway .................................. 904126

[51] Int. Cl.$^6$ .............................................. H01M 6/00
[52] U.S. Cl. ................................ 204/147; 204/150; 204/196; 204/197; 204/231; 204/DIG. 4; 429/119
[58] Field of Search ................ 204/147, 150, 196, 197, 204/231, DIG. 4; 429/119

[56] References Cited

U.S. PATENT DOCUMENTS 3,520,790 7/1970 Araki et al. ........................ 204/147
3,661,742 5/1972 Osborn et al. ..................... 204/147
4,306,952 12/1981 Jansen ................................ 204/149

FOREIGN PATENT DOCUMENTS

WO89/11165 11/1989 WIPO .
WO90/10957 9/1990 WIPO .
WO91/03079 3/1991 WIPO .

*Primary Examiner*—John Niebling
*Assistant Examiner*—Arun S. Phasge
*Attorney, Agent, or Firm*—Robbins, Berliner & Carson

[57] ABSTRACT

This invention relates to a method and means for preventing or greatly reducing biological growth on the cathode (7, 11) of a sea water cell (1) which is based on electrolytic reaction between oxygen, water and a metal anode (6, 10), and which is arranged to be connected to a load (3, 15) through a DC/DC converter (2, 14). An external power supply (5, 16) which may be powered from the load (3, 15), is at intervals connected to an electrode of copper (or copper alloy) (8, 12) included with the cell structure, to electrolytically dissolve copper. The negative terminal (18) of the power supply (16) may at intervals be connected to an auxiliary electrode (13) of a suitable metal or metal alloy such as copper, titanium or stainless steel. The interconnection of the power supply (5, 16) to the electrode (8, 12), and possibly to the auxiliary electrode (13) is controlled by a timing device (4, 17). At intervals, the same or a separate timing device (4, 17) may turn-off/switch-on the DC/DC converter (2, 14).

60 Claims, 2 Drawing Sheets

METHOD FOR PREVENTING SEA WATER CELLS FROM BEING DESTROYED BY BIOFOULING

The present invention relates to sea water cells or batteries which use oxygen dissolved in seawater as oxidant, like for instance cells described in PCT applications Nos. PCT/N089/00040 and PCT/N090/00045. The invention relates to a method for preventing sea water cells from being destroyed by biofouling.

Such sea water cells consist of an anode made from an electronegative alloy based e.g. on magnesium, zinc, aluminum or lithium and a cathode which is a more or less inert current conductor. The most common materials in the cathode are materials which are resistant to sea water, as e.g. copper, stainless steel, titanium or carbon. A cathode may also be covered with a catalyst which catalyses the reduction of oxygen. Sea water contains little oxygen, about 10 g/m$^3$. As a consequence oxygen reducing sea water cells must have a very open structure to insure sufficient flow of fresh sea water through the cell. Sea water cells are usually connected in parallel because the cells share the sea water as a common electrolyte. The common electrolyte would result in shortcircuiting currents via the sea water in series connected batteries. A DC/DC converter transforms the low voltage of the sea water cells (1 to 2 V) up to a more suitable value, as e.g. 28 V.

A great problem with sea water cells which must be opera rive over longer periods of time (months or years), is the biological growth on the cathode. This leads to increased resistance against transport of oxygen to the surface of the cathode,—resulting in reduced performance.

It is well known that copper and copper alloys are insertsitive to biological growth in sea water, because copper ions which are released by corrosion of the surface, have biocidic properties. It is for this reason that copper and copper compounds are used in growth preventing paint and antifouling, for subsea use.

The good properties of copper in sea water and the biocidic action of copper ions are the reason why copper is used as cathodes in sea water cells. Cells with copper cathodes have a lower cell voltage (about 1 V) than what is possible with other materials which are covered with a catalytic layer as e.g. catalyzed stainless steel (about 1.6 V), but this is compensated for in many applications by the absence of biological growth. The antifouling properties of the copper does, however, depend on the rate of corrosion of the copper. As the potential on a copper cathode is reduced when the current density on the surface is increased, the corrosion rate will decrease and thereby also the ability to prevent biological growth. For a light buoy this is not a problem because the cathode potential usually has time to increase sufficiently when the cell is unloaded between the light flash periods, so that the average corrosion is high enough. Another solution is of course to reduce the load on the cell and thereby prevent growth, or oversize the cell for the particular application.

The object of the present invention is to optimize the use of sea water cells of the mentioned type. The main features of the invention are defined in the accompanying claims. By using this invention there is obtained a substantial increase of the lifetime of sea water cells.

Figure 2:
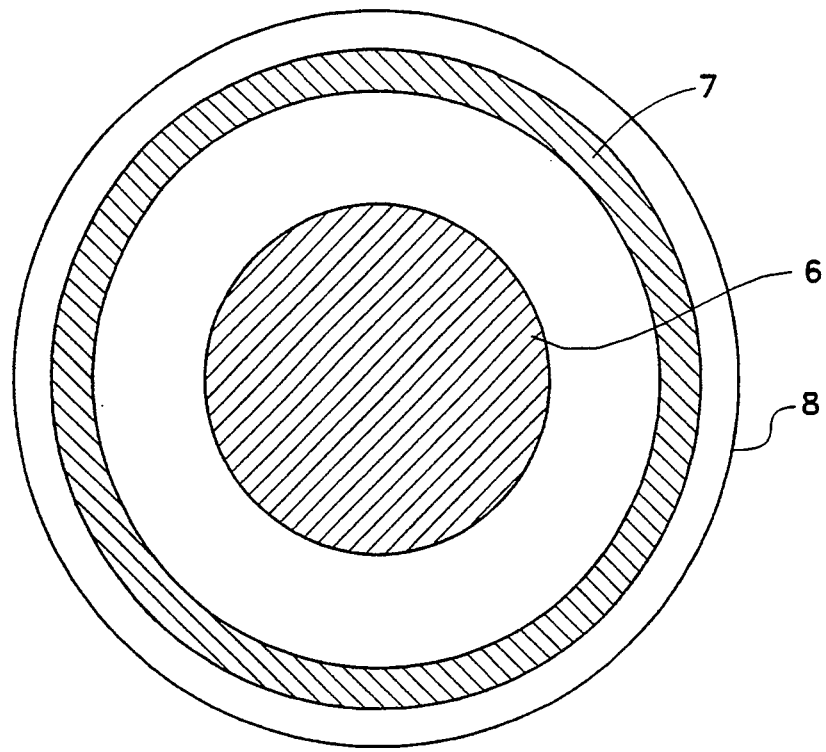
Figure 3:
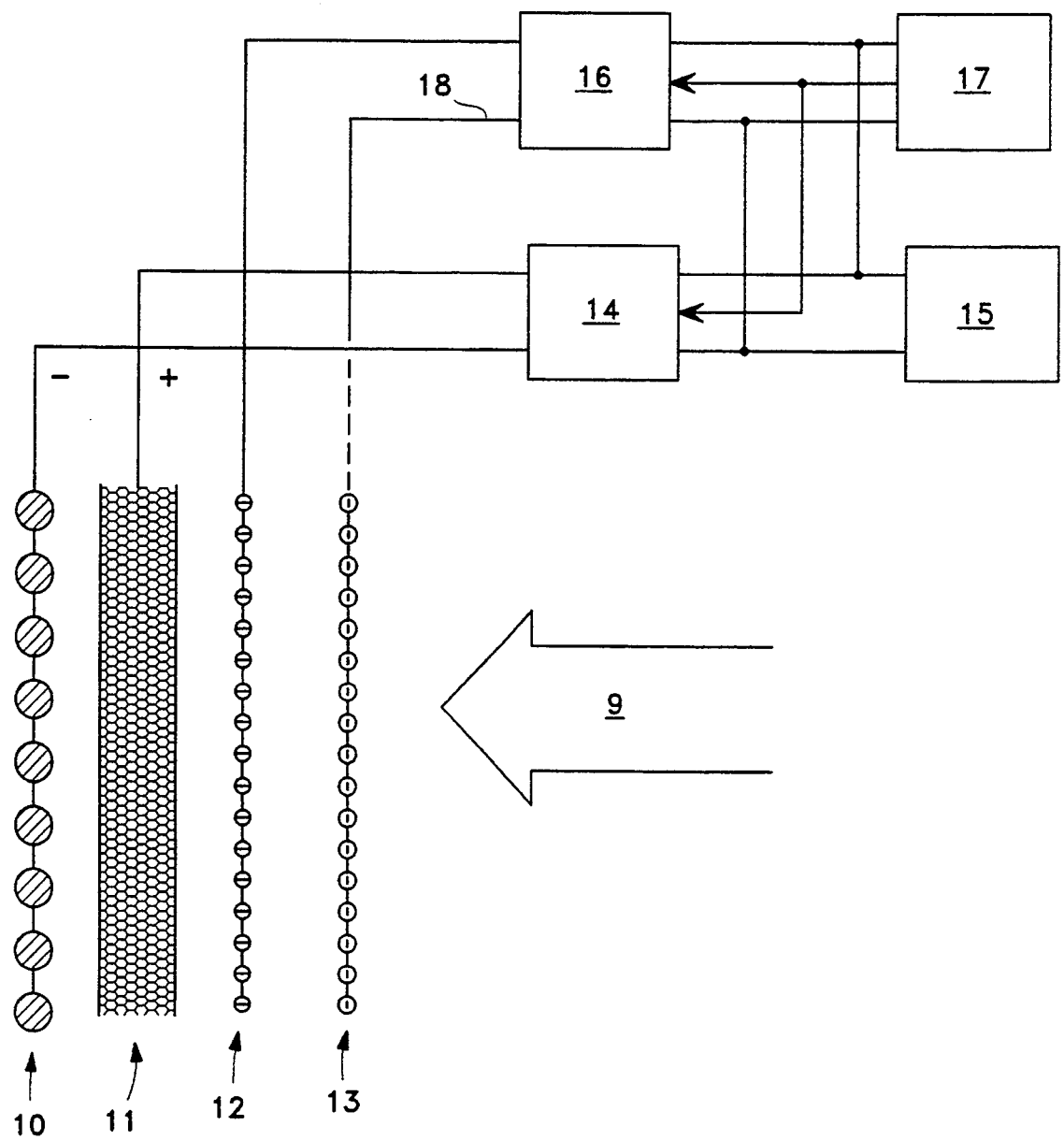

Above mentioned and other features and objects of the present invention will clearly appear from the following detailed description of embodiments of the invention taken in conjunction with the drawings, where FIG. 1 shows a diagram for a sea water cell plant, FIG. 2 shows the cross section of a cell without copper cathode, and FIG. 3 shows a principle diagram for water flow through a cell having an auxiliary electrode.

The method described in connection with FIG. 1 should be used in order to obtain optimum utilization of a cell. A sea water battery 1 is connected, over a DC/DC converter 2,—which converts the low cell voltage from the sea water battery, e.g. 1.0 V, to a more suitable voltage, e.g. 28 V,—in order to charge an accumulator 3.

If a greater growth protection is desired than what can be obtained by free corrosion of a copper cathode under load, a control circuit or timing device 4 can be arranged to periodically switch off the converter 2 and thereby the load of the sea water cell. One can thereby obtain the same as in cells which are used to operate light buoys with periodical light flashes or where a photo cell switches off the light during the day time. While the cell is unloaded, a possible user will take its power from the accumulator 3. The duration of such an "off pulse" should be a minimum of 10s and accumulated "off-time" could be 1 to 10% of the time. Seen from the sea water battery, the action of disconnecting the load from the accumulator or arranging a controlled switch between the converter and the accumulator corresponds to the action of turning off the converter 2.

If it is desirable to dissolve more copper in the sea water than what can be obtained by corrosion of an unloaded copper cathode, copper can be dissolved electrolytically. Thereby the biocidic action is increased further. It is assumed that the result is better with high concentrations on the surface in short periods than with low concentrations over longer periods of time. In accordance with the invention this can be achieved as shown in FIG. 1 by means of a separate current source, a DC converter 5, which in short periods sends current in the opposite direction through the cell. The converter 5 may e.g. reduce the accumulated voltage from 28 V to 1.5 V. A typical pulse would be about 10 As/m$^2$ cathode surface with about 6 hours between each pulse. For a cell with 5 m$^2$ cathode surface this corresponds to 5A in 10s, i.e. about 70 Ws. The energy consumption of the pulses is therefore very small relatively to what the sea water battery delivers. (This is typically 2 W for a light buoy.) The extra corrosion which results from the pulses corresponds to about 10 g copper per m$^2$ copper surface and year. This is so small that it has no practical influence on the life time of the cathode. The converter 5 may also have the form of a resistance (not shown) which is coupled directly between the positive terminal of the accumulator and the positive terminal of the sea water battery, but this is not considered to be an energy efficient solution.

The principle can also be used on cells not having copper cathodes, as shown with a sea water cell in FIG. 2. This figure shows a sea water cell seen from above. The cell consists of a cylindrical anode 6, made e.g. from magnesium, a cathode 7, made e.g. from catalyzed stainless steel, and a copper electrode 8, consisting of an expanded copper sheet or a copper net arranged concentrically around the cathode. This copper electrode is normally insulated from the cathode, and it will continuously release some copper to the sea water. The amount of copper in the sea water may be increased, either in the same manner as illustrated in connection with FIG. 1 by connecting the copper electrode 8, (which then will be a part of the cell), to the output terminal from the converter 5, or by connecting the copper electrode 8 to the cathode 7 via a control switch (not shown), such as a transistor, if the potential on the cathode 7 is high enough. This is the case with sea water cathodes of stainless steel which is catalyzed with cobalt nickel spinell. It is furthermore obvious that the growth preventing action will be obtained regardless of whether the structure 8 is on the inside, - on the outside or whether there is an expanded copper structure on both sides of the cathode 7. It should, however, be ensured that the cylinder or cylinders have a very open structure so that the waterflow through the cathode is not restricted.

In FIG. 3 is shown how the principle can be used in flow through cells when the sea water flows in the direction of the arrow 9. The figure shows; a flow-through anode 10, consisting e.g. of a row of parallel magnesium rods, a cathode 11, a net of copper 12 and an auxiliary electrode 13, which can be used as a counter electrode during the copper electrolysis instead of one of the electrodes of the sea water cell. The auxiliary electrode 13 may be made from a suitable metal or metal alloy such as copper, titanium or stainless steel. The figure further shows a converter 14 from low to high voltage, a secondary battery 15, a converter 16 from high to low voltage for the copper electrolysis, and a time circuit 17. If it is decided not to use an auxiliary electrode 13, the negative terminal 18 of the converter 16 must either be connected to the anode 10 (as in FIG. 1) or to the cathode 11, which is the preferred solution. In order to reduce deposits of copper on the anode, the cell should be unloaded while the electrolytic dissolution of copper takes place. The antifouling effect of copper in sea water is in this connection a remote action,—thus the amount of copper dissolved into the seawater must be increased substantially, by a factor 10 to 100, relatively to cells where the cathode itself is made from copper.

The above detailed description of embodiments of this invention must be taken as examples only and should not be considered as limitations on the scope of protection.

I claim:

1. Method for reducing biological growth on the cathode of a sea water cell during long term operation in sea water, said sea water cell being based on an electrolytic reaction between oxygen, sea water and a metal anode, for supplying electric energy to a storage battery powering an external load, said method comprising the step of:
   intermittently connecting an external power supply powered by said storage battery to a copper-containing electrode included in the structure of said sea water cell, to electrolytically dissolve copper, wherein electric energy supplied by said storage battery to the copper-containing electrode is substantially less than electric energy supplied by the storage battery to the external load.

2. Method according to claim 1, wherein a negative terminal of the external power supply is connected at intervals to an auxiliary electrode of a suitable metal or metal alloy.

3. Method according to claim 2, wherein the suitable metal or metal alloy is selected from copper, titanium, and stainless steel.

4. Method according to claim 1, wherein said intermittently connecting step further comprises the step of using a timing device.

5. Method according to claim 4, wherein the connection of the external power supply to the copper-containing electrode is also controlled by said timing device.

6. Method according to claim 4, wherein the cell is switched off 1–80% of the time and at least once every 24 hours.

7. Method according to claim 4, comprising the step of
   using a first DC—DC converter to connect an output of the sea water cell to an input of the storage battery.

8. Method according to claim 7, wherein time intervals for interconnecting the external power supply to the electrode are identical to time intervals for switching-off the first DC/DC converter.

9. Method according to claim 7 further comprising the step of
   using a second DC-DC converter to connect the external power supply to the copper-containing electrode.

10. Method according to claim 1, wherein the cell energy used for electrolysis is in the order of 0.001 to 5% of the total energy produced.

11. Method according to claim 1, further comprising the step of incorporating the copper-containing electrode in the cell cathode, as a structure separate from the cathode itself.

12. Method according to claim 1, further comprising the step of electrically insulating the copper-containing electrode from the cathode.

13. Method according to claim 1, further comprising the steps:
   connecting the copper-containing electrode as a cathode of the cell via a first DC/DC converter to the external storage battery for supplying an uninterrupted source of power derived from the current produced by the sea water cell to an external load,
   intermittently disconnecting the sea water cell from said first DC/DC converter to thereby unload said cathode,
   using a second DC/DC converter to intermittently connect said cathode to said external power supply via to thereby electrolytically dissolve copper from said cathode while the sea water cell is disconnected from the first DC/DC converter.

14. Method according to claim 13, wherein identical time intervals are used for connecting the power supply to the electrode and for unloading the cathode.

15. Method of claim 1, wherein the copper-containing electrode is a separate electrode.

16. Method according to claim 15, wherein the cathode consists essentially of stainless steel and a catalyst.

17. Method of claim 16, wherein a negative terminal of the external power supply is connected to the cathode.

18. Method according to claim 15, wherein the cathode consists of stainless steel, titanium, copper or carbon, and the step of intermittently connecting said external power supply to said copper-containing electrode further comprises the step of
   intermittently connecting said external power supply to said cathode as a counter electrode.

19. Method according to claim 1, wherein said metal anode consists of magnesium or aluminum and the step of intermittently connecting said external power supply to said copper-containing electrode further comprises the step of intermittently connecting said external power supply to said metal anode as a counter electrode.

20. Method according to claim 1, wherein the cell further comprises a separate electrode consisting of stainless steel, titanium or copper, and the step of intermittently connecting said external power supply to said copper-containing electrode further comprises the step of intermitently connecting said external power supply to said separate electrode as a counter electrode.

21. Method for reducing biological growth on a copper-containing cathode of a sea water cell during long term operation in sea water, said sea water cell being based on an electrolytic reaction between oxygen, water and a metal anode, said method comprising the steps:

connecting the cell to an external storage battery for supplying an uninterrupted source of power derived from the current produced by the sea water cell to an external load, intermittently disconnecting the sea water cell from said storage battery to thereby unload said cathode, and powering said external load only with power previously stored in said storage battery while copper is being dissolved from said cathode.

22. Method according to claim 21, wherein the copper is being dissolved from the cathode by corrosion.

23. Method according to claim 21, wherein the cathode is unloaded 1–80% of the time and at least once every 24 hours.

24. Method for reducing biological growth on the cathode of a sea water cell during long term operation in sea water, said sea water cell being based on an electrolytic reaction between oxygen, water and a metal anode, for supplying power to an external load, said method comprising the step of intermittently connecting said cathode to a separate copper-containing electrode included in the structure of said sea water cell, to electrolytically dissolve copper.

25. Method according to claim 24, wherein a timing device is arranged to short circuit the copper-containing electrode to the cell cathode during certain time intervals, by means of a switch.

26. Method according to claim 24, wherein a timing device is arranged to connect the copper-containing electrode to the cell cathode during certain time intervals, by means of a switched resistance.

27. Method according to claim 24, wherein the cathode consists of stainless steel and a catalyst.

28. Method according to claim 24, wherein the external load includes a storage battery.

29. Method according to claim 24, wherein said intermittent connecting step is controlled by a timing device.

30. Method according to claim 24, wherein the cell energy used for electrolysis of the copper is in the order of 0.001 to 5% of the total energy produced by the cell.

31. Method for preventing or greatly reducing biological growth on the cathode of a sea water cell which is based on an electrolytic reaction between oxygen, water and a metal anode, comprising the steps:

connecting the cell to a battery via a DC/DC converters, intermittently connecting a positive terminal of an external power supply powered from the battery to a copper-containing electrode included in the cell structure, with the negative terminal of the power supply connected to a counter-electrode of a suitable metal or metal alloy selected from copper, titanium, and stainless steel, to thereby electrolytically dissolve copper, using a timing device to control the connection of the power supply to the copper-containing electrode and to the counter-electrode, using the same or a separate timing device to switch the DC/DC converter on and off, and switching the DC/DC converter off 1–80% of the time and at least once every 24 hours, wherein the cell energy used for electrolysis is in the order of 0.001 to 5% of the total energy produced.

32. In combination with a sea water cell based on an electrolytic reaction between oxygen, sea water and a metal anode:

a copper-containing electrode included in the structure of said sea water cell, a storage battery powering an external load, and first timing means for intermittently connecting an external power supply powered by said storage battery to said copper-containing electrode, to thereby electrolytically dissolve copper, wherein the electric energy supplied by said storage battery to the copper-containing electrode is substantially smaller than the electric energy supplied by the storage battery to the external load.

33. The combination of claim 32, wherein a negative terminal of the external power supply is connected to a cathode of the sea water cell.

34. The combination of claim 33, wherein the suitable metal or metal alloy is selected from copper, titanium, and stainless steel.

35. The combination of claim 33, wherein the cell energy used for electrolysis is in the order of 0.001 to 5% of the total energy produced.

36. The combination of claim 32, wherein said first timing means comprises a timing device.

37. The combination of claim 36, wherein the connection of the external power supply to the copper-containing electrode is also controlled by said timing device.

38. The combination of claim 36, wherein the timing device switches the cell off 1–80% of the time and at least once every 24 hours.

39. The combination of claim 36 further comprising a first DC—DC converter coupled between the sea water cell and the storage battery.

40. The combination of claim 39, wherein said timing device employs identical time intervals for interconnecting the external power supply to the electrode and for switching-off the first DC/DC converter.

41. The combination of claim 39, wherein the copper-containing electrode is electrically insulated from the cathode.

42. The combination of claim 39 further comprising a second DC-DC converter coupled between the external power supply and the copper-containing electrode.

43. The combination of claim 32, wherein the copper-containing electrode is at least partly incorporated in the cell cathode, as a structure separate from the cathode itself.

44. The combination of claim 32, wherein the copper-containing electrode functions as a cathode of the cell, said combination further comprising a first DC/DC converter coupled between the cell and the external storage battery, second timing means for intermittently disconnecting the sea water cell from said first DC/DC converter to thereby unload said cathode, a second, DC/DC converter coupled between said cathode and said external power supply, wherein said first timing means intermittently connects said cathode to said external power supply via the second DC/DC converter while the sea water cell is disconnected from the first DC/DC converter.

45. The combination of claim 44, wherein said first and second timing means employ identical time intervals for connecting the external power supply to the electrode and for unloading the cathode.

46. The combination of claim 32, wherein the copper-containing electrode is a separate electrode.

47. The combination of claim 46, wherein the cathode consists essentially of stainless steel and a catalyst.

48. The combination of claim 47, wherein a negative terminal of the external power supply is connected to the cathode.

49. The combination of claim 46, wherein the cathode consists of stainless steel, titanium, copper or carbon, and the first timing means intermittently connects said external power supply to said cathode as a counter electrode.

50. The combination of claim 32, wherein said metal anode consists of magnesium or aluminum, and the first timing means intermittently connects said external power supply to said metal anode as a counter electrode.

51. The combination of claim 32, wherein the cell further comprises a separate electrode consisting of stainless steel, titanium or copper, and the first timing means intermittently connects said external power supply to said separate electrode as a counter electrode.

52. In combination:

a sea water cell including a copper-containing cathode, an external storage battery connected to the cell for supplying an uninterrupted source of power, and a timing device for intermittently disconnecting the sea water cell from said storage battery to thereby unload said cathode.

53. The combination of claim 52, wherein the timing device unloads the cathodes cathode 1–80% of the time and at least once every 24 hours.

54. In combination with a sea water cell based on an electrolytic reaction between oxygen, water and a metal anode:

a cathode, included within the sea water cell, a copper-containing third electrode included in the structure of said sea water cell, timing means for intermittently connecting said cathode to said third electrode, to thereby electrolytically dissolve copper from said separate electrode, and an external load connected between said anode and said cathode.

55. The combination of claim 54 further comprising a timing device arranged to short circuit the third electrode to the cathode during certain time intervals, by means of a switch.

56. The combination of claim 54, further comprising a timing device arranged to connect the third electrode to the cell cathode during certain time intervals, by means of a switched resistance.

57. The combination of claim 54, wherein the cathode consists of stainless steel and a catalyst.

58. The combination of claim 54, wherein the external load includes a storage battery.

59. The combination of claim 54 wherein said timing means comprises a timing device.

60. The combination of claim 54, wherein the cell energy used for electrolysis of the copper is in the order of 0.001 to 5% of the total energy produced by the cell.

* * * * *